United States Patent Office 3,042,607
Patented July 3, 1962

3,042,607
DRILLING FLUID
George R. Morris, 1117 S. Toledo, Tulsa, Okla.
No Drawing. Filed Jan. 6, 1960, Ser. No. 695
3 Claims. (Cl. 252—8.5)

This invention relates to improvements in well drilling fluids and more particularly, but not by way of limitation, to an additive for drilling fluids for preventing or greatly reducing the loss of the fluid through filtration and simultaneously preventing loss of the drilling mud during the well drilling operation.

This application is a continuation-in-part of my copending application Serial No. 677,198 filed August 9, 1957, now abandoned.

In the drilling of oil well bores, and the like, a drilling mud is continually circulated downwardly through the drill pipe and upwardly in the well bore and away from the drill bit. It is well known that water is continually lost from the drilling mud to permeable sub-surface formations, such as sand and the like. The structure of the permeable formation is usually such that the liquid parts of the drilling mud may permeate therethrough while the solids in the mud are held back in the well bore. The loss of excessive quantities of water from the drilling mud by filtration through the mud sheath on the wall of the well and into said formations is undesirable and creates a serious problem in the drilling industry. One common method used today in an attempt to reduce the filtration loss rate is to add a suitable preservative, such as starch, to the drilling mud.

The loss of the drilling mud through openings in subsurface formations occurs frequently, and creates an entirely different and separate problem from the filtration loss. The porous sub-surface formations may be of a varied structure, such as fissured or cracked formations, and it is usually difficult to accurately establish the exact condition and extent of the formation. Thus, it is difficult to determine the proper or most effective control method to apply for reducing or eliminating the loss of the fluid. The most common method in use today for the control of lost fluid circulation is the use of sealing or plugging agents in the drilling mud for bridging the pores or fissures of the sub-surface formation. A few examples of the sealing agents in use today are hay, excelsior, cottonseed hulls, nut hulls, chicken feathers, cork and leather, among many others.

The present invention contemplates an additive for drilling fluid which bridges the pores of the sub-surface formation for precluding or greatly reducing lost fluid circulation therethrough, and simultaneously decreasing the filtration loss of the liquid portions of the drilling fluid. The drilling fluid additive of the present invention comprises ground peach seeds having a suitable coating provided thereon. The ground peach seeds are sized in accordance with predetermined and carefully selected size ranges for effecting the most efficient bridging of the fissured formations, and the like. The coating is thoroughly applied to the ground peach seeds for covering each particle thereof.

The coating is readily soluble in the drilling mud and provides good thixotropic and suspension properties, good control of viscosity and gel strength, and is resistant to salt water, anhydrite, and cement contamination. These improved properties function to maintain the seed particles in suspension in the drilling fluid as it passes through the drill pipe and is exposed to the underground formations. Further, the colloidal coating material which is a well known type, as disclosed for example in the patent to Wagner 2,425,760, forms a highly efficient mud-sheath on the walls of a well bore during the drilling operation and causes the peach seeds to remain in the bore-hole as a part of the mud-sheath. This prevents the seeds from coming up in the well and recirculating therein. The seeds and coating, in addition to reducing the filtration loss of the mud, have a tendency to reduce the viscosity and final gel strength of the mud.

The thinner mud reduces the work load of the pumping equipment. Thus, the improved additive for drilling mud efficiently solves the major problems in the well drilling industry simultaneously, and reduces the wear on the pumping equipment for prolonging the useful life thereof.

It is an important object of this invention to provide an additive for drilling muds in rotary well drilling for effectively controlling lost fluid circulation during the drilling operation.

It is another object of this invention to provide an additive for drilling muds for efficiently reducing filtration loss of the liquid portions of the mud during the drilling operation.

Another object of this invention is to provide an additive for drilling muds wherein the final gel strength of the mud is reduced for lessening the work load of the pumping equipment.

Still another object of this invention is to provide an additive for drilling muds wherein the viscosity of the mud is reduced for a thinning of the mud to increase the efficiency of the drilling mud.

A further object of this invention is to provide an additive for drilling muds wherein the solid particles are sized in accordance with predetermined size ranges for effecting the most efficient bridging of porous sub-surface formations.

A still further object of this invention is to provide an additive for drilling muds wherein the solid particles are maintained in suspenson in the drilling mud for remaining in the well bore wthout recirculating with the drilling mud.

It is a further object of this invention to provide an additive for drilling mud which is equally effective for control of lost fluid circulation and filtration loss with either fresh water, salt water, or lime base drilling muds.

Other objects and advantages of the invention will be evident from the following detailed description.

More specifically, the present invention comprises ground peach seeds having a coating of caustic soda, quebracho, and sodium carboxymethylcellulose. The peach seeds are ground in any suitable manner. The ground peach seeds are graded in accordance with the particle sizes thereof to provide a mixture containing particles ranging in size from approximately a 4 mesh size to approximately a 200 mesh size. This size grading of the peach seed particles assures that all the particle sizes necessary for an efficient bridging of the porous sub-surface formations will be present in the additive. In drilling, colloidal mud particles, water, and the smaller seed particles will continually filter into porous formations until an effective mud-sheath is formed by the larger peach seed particles first bridging the openings in the formation, followed by further bridging of the smaller seed particles about the larger particles and finally by compaction of the colloidal mud between and around said particles.

An example of a preferred mixture of the graded peach seed particles includes:

10%—4 mesh size particles
20%—16 mesh size particles
10%—30 mesh size particles
10%—40 mesh size particles
10%—50 mesh size particles
10%—70 mesh size particles
10%—80 mesh size particles
10%—100 mesh size particles
10%—140 mesh size particles A first solution is prepared by mixing any suitable caustic, for example caustic soda (NaOH), and quebracho together in water. It is preferable to use approximately by weight 25% caustic soda and approximately 75% quebracho. For example, 55 grams of quebracho and 40 grams of sodium hydroxide may be combined with 400 cubic centimeters of water. It is preferable to dissolve the 40 grams of sodium hydroxide in approximately 200 cubic centimeters of hot water to provide a slurry solution. The 55 grams of quebracho are added to the slurry solution, and then the remaining 200 cubic centimeters of water are added to complete the first solution. It will be apparent that the invention is not limited to this particular method of preparing the first solution. The mixture is thoroughly beaten in any suitable manner to assure a homogeneous mixture. The ground peach seeds are added to the solution and remain therein until the seed particles are thoroughly saturated with the solution. The quantity of solution set forth herein is for receiving approximately 2000 grams of the ground and graded peach seeds. The resultant mixture of the ground seeds and quebracho and caustic soda solution is stiff or almost dry.

A second solution is made which consists of sodium carboxymethylcellulose (CMC) mixed with water. It is preferable to utilize a solution having proportions equal to 25 grams of sodium carboxymethylcellulose combined with 200 cubic centimeters of water. The mixture is suitably combined and stirred, or the like, to provide a homogeneous mixture. It has been found that the best results are obtained when the water is at a temperature of approximately 80° F. The second solution is added to the first mixture of seeds and caustic soda and quebracho for a resaturation of the seeds. This results in coating of the seed particles completely and thoroughly with a hardened adhesive type of coating. This coating adheres very strongly to the seed particles, and does not fall off or break apart when the coating is dried. The coated seed particles are dried at a temperature of approximately 200° to 350° F. until they are completely dry. It usually takes approximately one hour for a thorough drying of the seed particles thus coated. The dried and coated seed particles are then passed through a suitable mill for breaking the particles apart, and to assure that each seed particle is separate and individual.

The coated seed particles are then sacked or suitably packaged for commercial sale. The coated seed particles may be added to the drilling mud in any manner as is well known in the drilling industry.

The seed particles of the additive function to efficiently bridge any sub-surface porous formations, such as fissured or cracked formations, in order to control the loss of the drilling fluid therethrough. The variation of particle sizes within the additive provides for the most efficient bridging of the porous sub-surface formations and assures an effective control of lost fluid circulation. The size range has been carefully selected to include all particle sizes found to be necessary for the optimum bridging qualities.

The coating dissolved in the mud conditions the mud for a more efficient utilization thereof. The coating materials have a tendency to reduce the viscosity and final gel strength of the mud, thereby providing a thinner mud. This thinner mud greatly reduces the work load on the pumping equipment to provide a more efficient utilization thereof. Furthermore, the torque of the drill pipe is greatly reduced by the improved condition of the mud. In addition, the dissolved coating in the mud greatly reduces the rate of filtration loss of the liquid portion of the drilling mud.

From the foregoing, it will be apparent that the present invention provides an improved additive for drilling muds for rotary well drilling. The additive provides for a simultaneous control of lost fluid circulation by using the peach seed particles and filtration loss by using the coating material, thereby solving two great problems of the drilling industry with one treatment of the drilling mud. The improved drilling mud additive is simple and efficient in utilization and economical in manufacture.

Olive stones or pits, cherry stones, apricot seeds, avocado seeds, plum seeds and the like may be utilized in lieu of the ground peach seeds. These materials may be ground in any suitable manner to conform to the same particle sizes as hereinbefore set forth for the peach seeds, and coated in a similar manner for providing an additive for well drilling fluid.

Changes may be made in the combination and arrangement of elements as heretofore set forth in the specification, it being understood that any modification in the precise embodiment of the invention may be made within the scope of the following claims without departing from the spirit of the invention.

What is claimed and desired to be secured by United States Letters Patent is:

1. An additive for drilling fluid consisting essentially of ground material selected from the group consisting of peach seeds, olive stones, cherry stones, apricot seeds, avocado seeds and plum seeds ranging in size from about 4 mesh to about 200 mesh size, said ground material being coated with a first solution consisting essentially of water and substantial amounts of caustic soda and quebracho, and coated with a second outer coating of carboxymethylcellulose.

2. An additive as defined in claim 1, wherein said solution of caustic soda and quebracho contains 40 parts by weight of the former to about 55 parts by weight of the latter.

3. An additive for drilling fluid as defined in claim 1, wherein said first coating consists essentially of caustic soda and quebracho in approximately 40:55 parts by weight ratio and said second coating consists essentially of about 25 parts by weight of carboxymethylcellulose.

References Cited in the file of this patent

UNITED STATES PATENTS

| | | |
|---|---|---|
| 2,425,768 | Wagner | Aug. 19, 1947 |
| 2,634,098 | Armentrout | Apr. 7, 1953 |
| 2,739,940 | Barrett | Mar. 27, 1956 |
| 2,779,417 | Clark et al. | July 30, 1957 |
| 2,873,250 | Scott | Feb. 10, 1959 |
| 2,943,679 | Scott et al. | July 5, 1960 |
| 2,943,680 | Scott et al. | July 5, 1960 |

OTHER REFERENCES

Rogers: Composition and Properties of Oil Well Drilling Fluids, pub. 1953 by Gulf Pub. Co. of Houston, Texas, revised edition, pages 338 and 339.